United States Patent Office 3,378,378
Patented Apr. 16, 1968

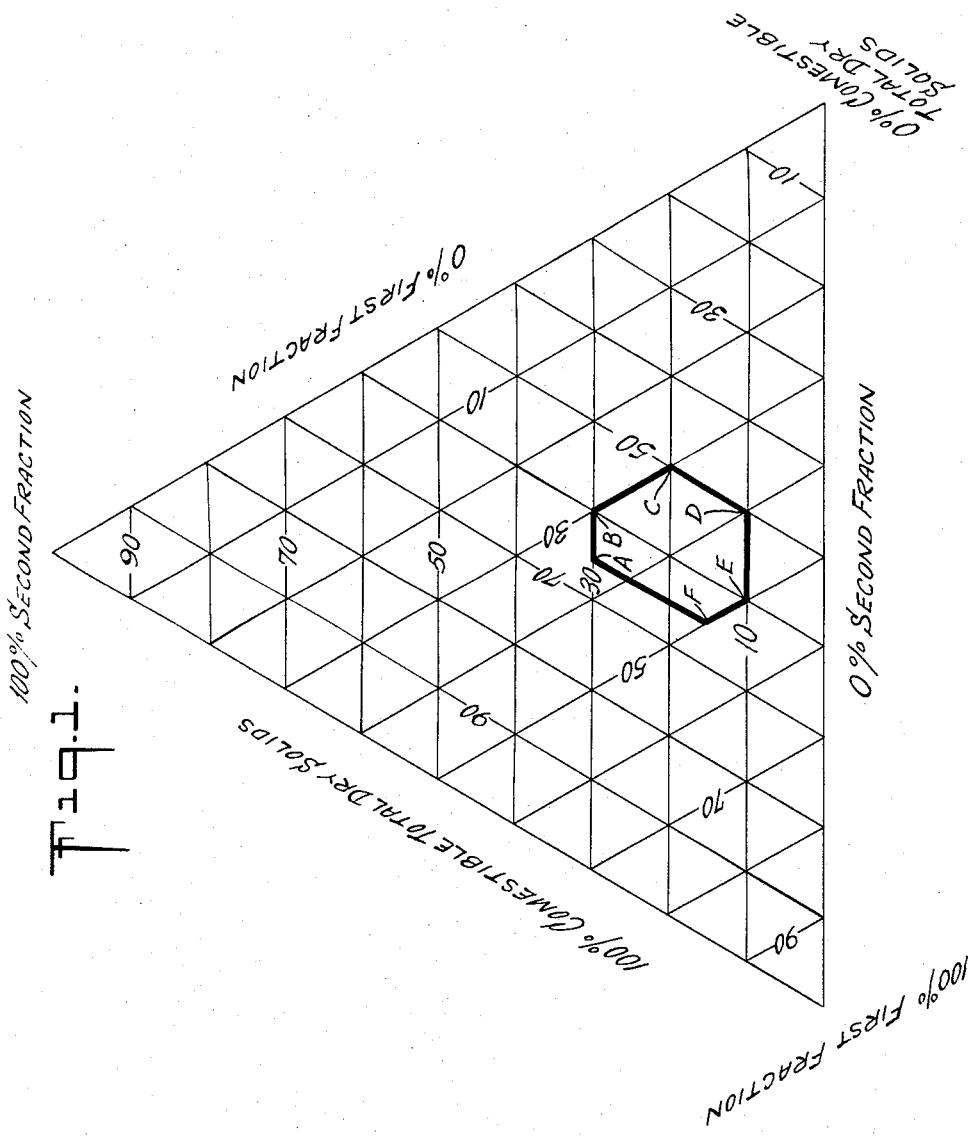

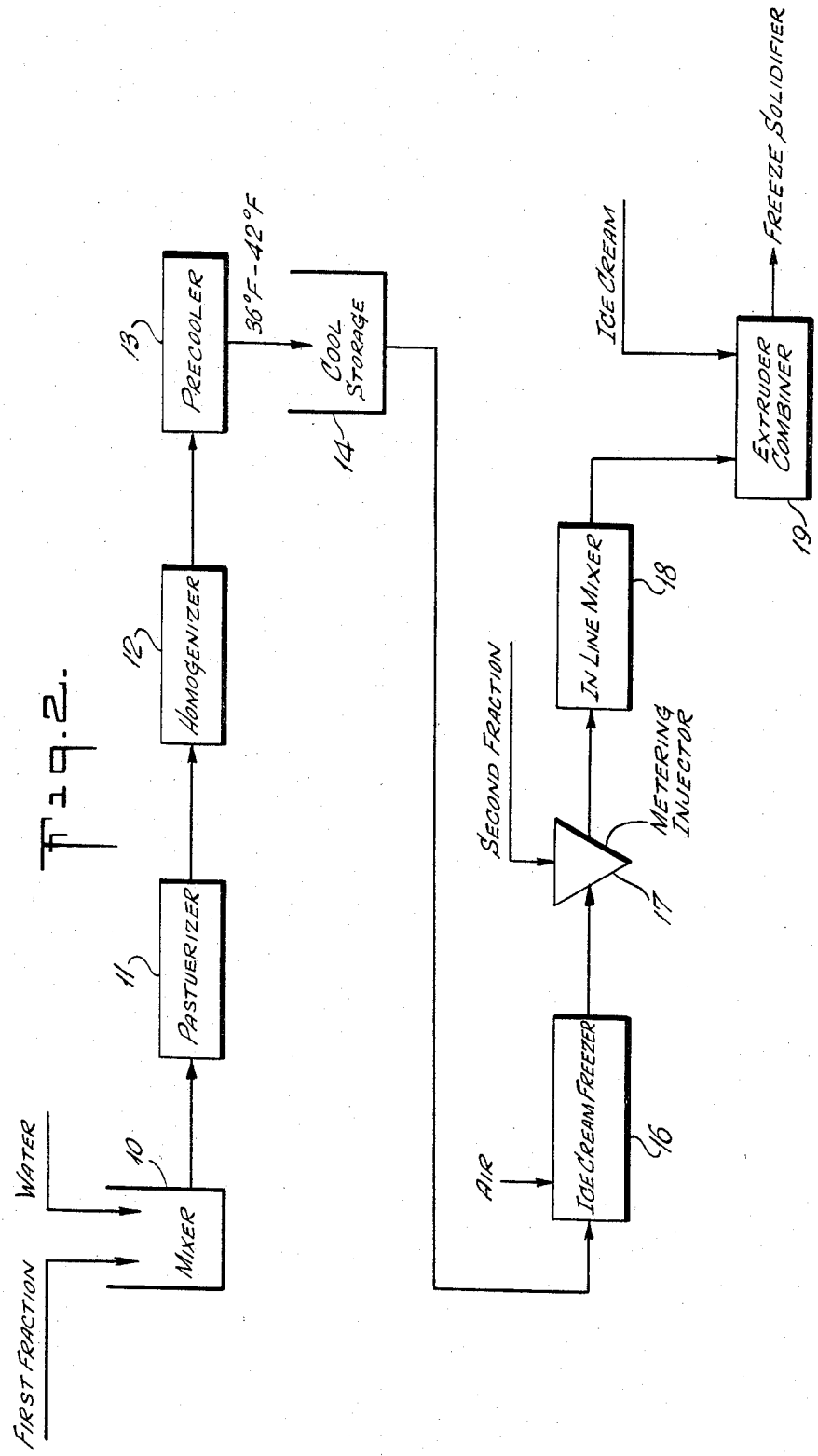

3,378,378
FROZEN COMESTIBLE
Abraham H. Goodman, Great Neck, Edward F. Pettinato, Bronx, Alfred Kroll, Forest Hills, and David H. Lipka, Flower Hill, N.Y., assignors to DCA Food Industries, Inc., New York, N.Y., a corporation of New York
Filed Mar. 3, 1966, Ser. No. 530,776
22 Claims. (Cl. 99—136)

ABSTRACT OF THE DISCLOSURE

A frozen comestible comprising an aqueous admixture of a first fraction and a second fraction. The first fraction serves as a matrix for the second fraction and the second fraction includes a relatively coarse particulate prebaked farinaceous product. The resulting comestible has the texture, appearance and palatability of frozen baked cake. The comestible may be manufactured with substantially conventional equipment used for making ice cream.

---

The present invention relates generally to improvements in comestibles and it relates in particular to an improved method for the production of a frozen comestible of the nature of an ice cream cake.

In the production of ice cream cakes by procedures generally practiced heretofore, the cake is produced at a bakery by the conventional methods in the desired shape, commonly as flat sheets and is then packaged and shipped to the ice cream plant, where the ice cream is produced in a semi-frozen fluid state and applied to the cake. The composite product is then frozen and packaged and distributed through the usual channels. The above procedure possesses many drawbacks and disadvantages. The producer of the ice cream cake frequently must rely upon an independent bakery for the regular supply of the cake component in a condition and shape suitable for combining it with the ice cream in the production of the ice cream cake and the conventional cake maintains this suitable condition for only a limited time. Furthermore, combining the cake and ice cream is an expensive and time-consuming procedure, of little flexibility and adaptability. Thus, the conventional procedure for the production of ice cream cake is costly, inefficient and of limited application.

It is, therefore, a principal object of the present invention to provide an improved method for the production of comestibles.

Another object of the present invention is to provide an improved method for the production of frozen comestibles of the nature of ice cream cake and the like.

Still another object of the present invention is to provide an improved method for the production of ice cream cake wherein are obviated the requirement of the preshaped baked cake component and its attendant limitations.

A further object of the present invention is to provide an improved method for the production of ice cream cake wherein only conventional ice cream producing equipment is required.

Still a further object of the present invention is to provide an improved method of the above nature characterized by its efficiency, economy and flexibility and the adaptability, high quality and low cost of the end product.

The above and other objects of the present invention will become apparent from a reading of the following description taken in conjunction with the accompanying drawing, wherein FIGURE 1 is a graph in which the delineated area covers the ranges of proportions of ingredients of the present comestible; and FIGURE 2 is a flow diagram illustrating a preferred procedure in accordance with the present invention for producing the improved comestible.

In a sense, the present invention contemplates the provision of a frozen comestible comprising a matrix formed of between 35% and 50% by weight of said comestible of water, and between 30% and 50% by dry weight of said comestible of a normally solid first fraction of a material at least suspended in said water, and a second fraction of a relatively coarse particulate edible material which is dispersed through and supported by said matrix and constituting 10% to 30% by dry weight of said comestible, a major part of said second fraction being a baked farinaceous product, containing between 50% and 65% by dry weight of non-aqueous solids. Another feature of the present invention resides in the method of producing the improved frozen comestible which comprises admixing the first fraction with water and cooling the mixture to form a viscous flowable mass and thereafter dispersing the second fraction in the flowable mass and freezing the mixture to a solid state.

The parameters set forth are delineated by the area in the graph of FIGURE 1, all percentages being based on dry weight of the total weight of the comestible.

The novel frozen comestible is of the nature of a frozen cake and may have the texture, appearance and palatability of conventional frozen baked cake or may be widely modified in these properties and possesses many advantages over the conventional ice cream cake in that it is more convenient and efficient to produce, is susceptible to the production of a greater variety of products and is of overall superior quality. It has been discovered that in order to obtain a product of the aforesaid nature the ranges of water and dry ingredients and the proportions thereof forming the matrix and in a relatively coarse particulate state dispersed in the matrix are critical.

The materials of the first fraction are either water-soluble or are suspendible in water and advantageously comprise for the most part milk solids, sugars and fats, aside from or as contained in the milk solids, and in addition preferably contains other ingredients such as stabilizers, emulsifiers, sequestering agents, flavors, coloring and the like. The materials of the second fraction is in at least a major part a prebaked product and advantageously is primarily of a particle size between 2 and 30 mesh and may be crushed cookies, cake in a dried state which is particulated in any suitable manner, or the like.

The first fraction is homogeneously admixed with the water and cooled advantageously to a temperature of 19° F. to 29° F. to a fluid semisolid state to form the matrix, advantageously, though not necessarily, with an overrun. Conventional ice cream producing equipment may be employed to great advantage in this mixing. The second fraction is then admixed with the fluid matrix and the mixture thereafter frozen to a solid state, the second fraction being dispersed in and supported by the solid matrix. The mixture of the matrix and the second fraction while in a fluid state is extruded or otherwise formed to any desired shape before it is freeze hardened, either alone or with ice cream or the like which may be concurrently and continuously produced and combined with the fluid mixture in any desired arrangement. The second fraction may be admixed with the aqueous matrix composition before the cooling of the latter and the mixture then freeze hardened. In the latter procedure, the baked farinaceous material is advantageously coated with a thin layer of fat or other water protective material.

The material of the first fraction which forms a support matrix with the water is at least suspendible in the water, that is, it is water-soluble or is so finely divided or of such a nature as to form a suspension therein. Advantageously between 7% and 28% by weight of the first fraction are non-fat milk solids and the like and between 10% and 30% are one or more sugars. In addition, the first material preferably contains fat, a stabilizer, an emulsifier, a sequestering agent if desired and a flavoring. The following is the preferred ranges of percentages based on the weight of the matrix of the ingredients of the first fraction solids material by dry weight:

| Ingredient: | Percent |
| --- | --- |
| Fat | 0–16 |
| Non-fat milk solids | 7–28 |
| Sugar | 10–30 |
| Stabilizer | 0.1–1.0 |
| Emulsifier | 0–0.2 |
| Additives (flavors, coloring) | 0–15 |

While the fat is advantageously buter fat, it may be substituted in whole or in part by a suitable vegetable or animal fat—such as commercially available products known as Mellorine, or the like. The non-fat milk solids may be dried milk or dried non-fat milk as such, milk or skim milk as such, buttermilk whole or solid, or whey, calculated on the solids content thereof with the water calculated as part of the water phase of the present composition, or similarly, evaporated milk, or condensed sweet cream, butter milk and combinations thereof and the like, and may include as a part thereof caseinates, for example, casein prepared by precipitation with gums, ammonium caseinate, sodium caseinate, and calcium caseinate. The sugar may be, for example, sucrose, dextrose, corn syrup, invert sugar, various sweet syrups, lactose, fructose, maltose, and the like and combinations thereof.

The stabilizer may be a natural or artificial gum, for example, agar-agar, algin, gelatin, guar seed gum, gum acacia, gum tragacanth, Irish moss, pectin, propylene glycol, alginate, sodium carboxymethylcellulose and the like. As an emulsifier there may be employed the monoglycerides or diglycerides or both of fat forming fatty acids or the polyoxethylene emulsifiers such as Tween 65 and Tween 90. The sequestering agent is advantageously tetrasodium pyrophosphate.

The miscellaneous additives may include one or more natural or artificial colors and flavors, for example, chocolate, cocoa, ground spices, coffee, vanilla, fruit, fruit extracts and juices, nut meats, marshmallow, candy confections, crunches and the like.

The matrix advantageously, but not necessarily, contains an overrun, that is, injected air which increases the volume of the matrix. The overrun is advantageously up to 100% and preferably between 30% and 70%, that is, the volume of the matrix is increased in volume or expanded by the overrun percentage based on the unexpanded volume of the matrix. The air is injected following the mixing of the dry ingredients with the water and the homogenization thereof and during the cooling of the matrix to form a flowable viscous mass and prior to the addition of the coarse second fraction material.

The second faction is a relatively coarse particulate material comprising in at least a major part thereof a baked farinaceous material of low moisture content and wherein a major part of the material is of a particle size between 2 mesh and 30 mesh, advantageously not more than 10% thereof being coarser than 2 mesh and not more than 30% thereof being finer than 30 mesh. The baked farinaceous material of the second fraction advantageously has a moisture content in its premixed state of between 1% and 15% based on the weight thereof and preferably between 5% and 8%.

The material of the second fraction may be, for example, any crunched cake or cookie or other baked farinaceous product having a moisture content not exceeding 15% and the particle size above set forth. The bulk density or specific gravity of the second fraction material advantageously does not exceed 0.80 and is preferably between 0.25 and 0.40. The preferred composition of the baked farinaceous portion of the second fraction material or the body thereof is:

| Ingredient: | Percent |
| --- | --- |
| Moisture | 1–15 |
| Fat | 2–20 |
| Sugar | 15–40 |
| Starch | 35–65 |
| Protein | 3–10 |

In adidtion to the above, the baked farinaceous second fraction material may contain up to 15% of the weight thereof of other additives such as flavors, for example, cocoa, chocolate, salt, spices, vanilla, dried fruits, nuts and the like, coloring, etc. Up to 50% of the second fraction may include coarse particulate fruits, nuts, coconut meat, marshmallow, chocolate chips, confection chips or other particulate edible material.

In preparing the improved frozen comestible according to a preferred procedure of the present invention, the first solids fraction is admixed with the water to effect the solution of the water-soluble portion thereof and the dispersion of the water-insoluble portion in the water, and the resulting mixture is then advantageously homogenized to produce a uniform product with the insolubles substantially in aqueous suspension. Thereafter, the mixture is cooled to a temperature between 19° F. and 26° F. to a matrix-defining viscous flowable mass with the injection of air therein to produce the desired overrun, preferably between 30% and 70%. The second fraction is then added and uniformly dispersed in the matrix and the resulting mixture shaped and frozen to effect the solidification thereof.

Conventional ice cream producing equipment may be employed in the present process which may be of a batch or continuous nature. The final freeze hardening step may be preceded by the extrusion of other forming of the product into any desired shape or may form, for example, a sheet, and this may be packaged as such or combined with other similar or different comestible sheets which may likewise be concurrently extruded or may be formed into stickless as well as stick-supported novelty products in various combinations.

Referring now to FIGURE 2 of the drawings which illustrates a preferred form of the present procedure for producing the present product packaged in alternate layers with ice cream or other extrudable material, conventional ice cream producing equipment being employed throughout, reference numeral 10 generally designates a mixer into which is metered or batch fed the first fraction and water in the desired matrix proportions. The mixing is effected so as to dissolve the water soluble portion of the first fraction and uniformly disperse the remainder thereof to produce a uniform mixture in the mixer 10. The liquid mix flows from mixer 10 through any suitable pasteurizer 11 to a continuous homogenizer 12 of conventional type, the homogenized pasteurized liquid passing through a precooler 13 where its temperature is reduced to 36° F. to 42° F., into a cool storage tank 14.

The cooled liquid matrix is pumped from tank 14 through any conventional continuous ice cream freezing device 16 where air is preferably injected and entrapped therein to produce an overrun of preferably 30% to 70% and it is cooled to a temperature of preferably between 19° F. and 26° F. in which state it is a viscous flowable homogeneous mass. A metering injector 17 of known construction feeds the particulate second fraction into the cooled matrix at a predetermined rate and the cooled matrix and the second fraction material carried thereby flow through a mixer 18, preferably of the in-line type, to any suitable shaping device such as an extruder 19. The shaped product is then freeze-solidified either as such, in packaged form alone, or with one or more alternating layers of ice cream or the like which may be concurrently shaped therewith. The freeze solid temperature of the end product is preferably below 0° F.

The following are examples of the first fraction which may be employed to advantage, given in percent by weight of the matrix, the remainder of the matrix, by percent by weight of water being admixed therewith to form the matrix:

Example I

| | Percent |
|---|---|
| Butterfat | 12 |
| Non-fat milk solids | 11.5 |
| Sugar | 23 |
| Cocoa solids | 3.5 |
| Stabilizer | 0.4 |
| Emulsifier | 0.1 |

Example II

| | |
|---|---|
| Butterfat | 10 |
| Non-fat milk solids | 12 |
| Sugar | 24 |
| Cocoa solids | 3 |
| Stabilizer | 0.4 |
| Emulsifier | 0.1 |

Example III

| | |
|---|---|
| Butterfat | 5 |
| Non-fat milk solids | 13 |
| Sugar | 25 |
| Cocoa solids | 4 |
| Stabilizer | 0.4 |
| Emulsifier | 0.1 |

Example IV

| | |
|---|---|
| Fats | 0 |
| Non-fat milk solids | 15 |
| Sugar | 27 |
| Cocoa solids | 4 |
| Stabilizer | 0.4 |
| Emulsifier | 0.1 |

Example V

| | |
|---|---|
| Vegetable fat | 10 |
| Non-fat milk solids | 12 |
| Sugar | 24 |
| Cocoa solids | 3 |
| Stabilizer | 0.4 |
| Emulsifier | 0.1 |

Example VI

| | |
|---|---|
| Butterfat | 12 |
| Non-fat milk solids | 13 |
| Sodium caseinate | 1 |
| Sugar | 23 |
| Stabilizer | 0.4 |
| Emulsifier | 0.1 |
| Flavor | To taste |

Example VII

| | |
|---|---|
| Butterfat | 12 |
| Non-fat milk solids | 13 |
| Sugar | 23 |
| Strawberry | 6 |
| Stabilizer | 0.4 |
| Emulsifier | 0.1 |

Example VIII

| | |
|---|---|
| Butterfat | 12 |
| Non-fat milk solids | 13 |
| Sodium caseinate | 1 |
| Sugar | 23 |
| Banana | 10 |
| Stabilizer | 0.4 |
| Emulsifier | 0.1 |

Example IX

| | Percent |
|---|---|
| Butterfat | 10 |
| Non-fat milk solids | 14 |
| Sugar | 25 |
| Orange | 3 |
| Lemon | 2 |
| Stabilizer | 0.4 |
| Emulsifier | 0.1 |

Example X

| | |
|---|---|
| Butterfat | 14 |
| Non-fat milk solids | 11 |
| Sugar | 25 |
| Cocoa solids | 5 |
| Stabilizer | 0.4 |
| Emulsifier | 0.1 |

In the above examples, although the stabilizer is advantageously sodium carboxymethylcellulose and the emulsifier a monoglyceride or diglyceride of a fat forming fatty acid, other stabilizers and emulsifiers may be employed. Moreover, where fruits are employed as flavoring these should be in a relatively finely divided state.

The second fraction is advantageously a cookie or cake produced in acordance with conventional baking practices, having a moisture content not exceeding 15%, preferably between 5% and 8% comminuted or crushed to a particle size and having a bulk density as earlier set forth. The particulate second fraction may be admixed with any of the above matrices in the manner described and within the range of proportions above set forth. For example, 30 parts of a high shortening containing particulated cookie may advantageously be admixed with 100 parts of the matrix of Example IV, 30 parts of a medium rich shortening particulated chocolate cookie may be advantageously admixed with 100 parts of the matrix of Example III, 26 parts of particulated cookie may be admixed with the matrix of Example I, 28 parts of particulated chocolate cookie may be admixed with the matrix of Example II, 23 parts of particulated chocolate cookie may be admixed with the matrix of Example V, 22 parts of a particulated orange lemon cake may advantageously be admixed with 100 parts of the matrix of Example IX and 15 parts of particulate cookie may be admixed with the matrix of Example X.

While there have been described preferred embodiments of the present invention it is apparent that numerous alterations, omissions and additions may be made without departing from the spirit thereof.

We claim:
1. A comestible comprising an aqueous admixture of a first fraction and a second fraction, said admixture containing between 50% and 65% by weight of solids and the balance water, said first fraction including at least milk solids and a sweetening agent and constituting between 30% and 50% by dry weight of said admixture, said second fraction including a relatively coarse particulate edible material constituting between 10% and 30% by dry weight of said admixture, a major portion of said second fraction being a prebaked farinaceous product, said prebaked farinaceous product constituting at least 10% by dry weight of said admixture, the admixture of said first and second fractions being frozen.

2. A comestible according to claim 1, wherein the admixture is expanded by the injection of a gas to a volume of up to 100% of the volume of the unexpanded admixture.

3. A comestible according to claim 1, wherein the farinaceous product in its premixed state has a moisture content of between 1% and 15% based on the weight thereof.

4. A comestible according to claim 1, wherein the farinaceous product in its premixed state has a moisture content of between 5% and 8% based on the weight thereof and is selected from the group consisting of crushed cookie, crushed cake and combinations thereof.

5. A comestible according to claim 1, wherein no more than 10% of said product has a particle size coarser than 2 mesh and no more than 30% thereof has a particle size finer than 30 mesh.

6. A comestible according to claim 1, wherein the first fraction contains between 7% and 28% by weight of non-fat milk solids and between 10% and 30% by weight of sugars.

7. A comestible according to claim 1, wherein the first fraction in addition includes fats.

8. A comestible according to claim 7, wherein the fats are up to 16% by weight of the first fraction.

9. A comestible according to claim 1, wherein the first fraction contains a stabilizer.

10. A comestible according to claim 1, wherein the first fraction contains an emulsifier.

11. A comestible according to claim 1, wherein the percentages by dry weight of solids, first fraction and second fraction are in the area bounded in the ternary diagram of FIG. 2 bounded by the lines AB, BC, CD, DE, EF and FA.

12. A comestible according to claim 1, wherein the first fraction includes non-fat milk solids, sugars, fats, stabilizers, emulsifiers, and additives selected from the group consisting of coloring agents, cocoas, flavoring agents and confections.

13. A comestible according to claim 12, wherein the first fraction contains between 7% and 28% of non-fat milk solids, between 10% and 30% of sugars, up to 16% of fats, between 0.1% and 1% of stabilizer, up to 0.2% of emulsifiers and up to 15% of additives.

14. A comestible according to claim 12, wherein the fat is selected from the group consisting of butter fat, vegetable fat, animal fat, and combinations thereof.

15. A comestible according to claim 12, wherein the non-fat milk solids are selected from the group consisting of dried milk, dried non-fat milk, skim milk, buttermilk, whey, evaporated milk, condensed sweet cream, and combinations thereof.

16. A comestible according to claim 12, wherein the sugars are selected from the group consisting of sucrose, dextrose, corn syrup, invert sugar, lactose fructose, maltose and combinations thereof.

17. A comestible according to claim 12, wherein the stabilizer is a gum selected from the group consisting of agar-agar, algin, gelatin, guar seed gum, gum acacia, gum tragacanth, Irish moss, pectin, propylene glycol, alginate and sodium carboxymethylcellulose.

18. A comestible according to claim 12, wherein the emulsifier is selected from the group consisting of monoglycerides of fat forming faty acids, diglycerides of fat forming fatty acids and polyoxyethylene emulsifiers.

19. A comestible according to claim 12, wherein the additives are selected from the group consisting of chocolate, cocoas, ground spices, coffee, vanilla, fruit, fruit extracts and juices, nut meats, marshmallow, candy confections and crunches.

20. A comestible according to claim 1, wherein the farinaceous product of the second fraction includes between 2% and 20% of fat, between 15% and 40% of sugar, between 35% and 65% of starch, between 3% and 10% protein and up to 15% of an additive selected from the group consisting of coloring agents, flavoring agents and confections.

21. A comestible according to claim 1, wherein the second fraction includes up to 20% by dry weight of the admixture of a product selected from the group consisting of fruits, nuts, coconut meat, marshmallow, chocolate chips and confection chips.

22. A comestible according to claim 1, wherein the comestible further includes ice cream, the admixture and the ice cream forming alternate layers.

References Cited

UNITED STATES PATENTS

| | | | |
|---|---|---|---|
| 2,619,422 | 11/1952 | Diamond | 99—136 |
| 3,185,574 | 5/1965 | Gubby et al. | 99—86 |

OTHER REFERENCES

Frandsen, J. H.: The Manufacture of Ice Cream and Ices, Orange Judd Pub. Co., New York, 1923 pp. 99–100.

Heller: Heller's Guide for Ice Cream Makers, B. Heller Pub. Co., Chicago, 1918, pp. 51, 52, 53.

Turnbow, G. D.: The Ice Cream Industry, John Wiley & Sons Inc., 1947, 2nd ed., p. 20.

Sommer, H. H.: Theory and Practice of Ice Cream Making, Sommer Pub., 6th ed., 1951, pp. 27–28 and 644.

A. LOUIS MONACELL, *Primary Examiner.*

J. M. HUNTER, *Examiner.*